Figure 1:
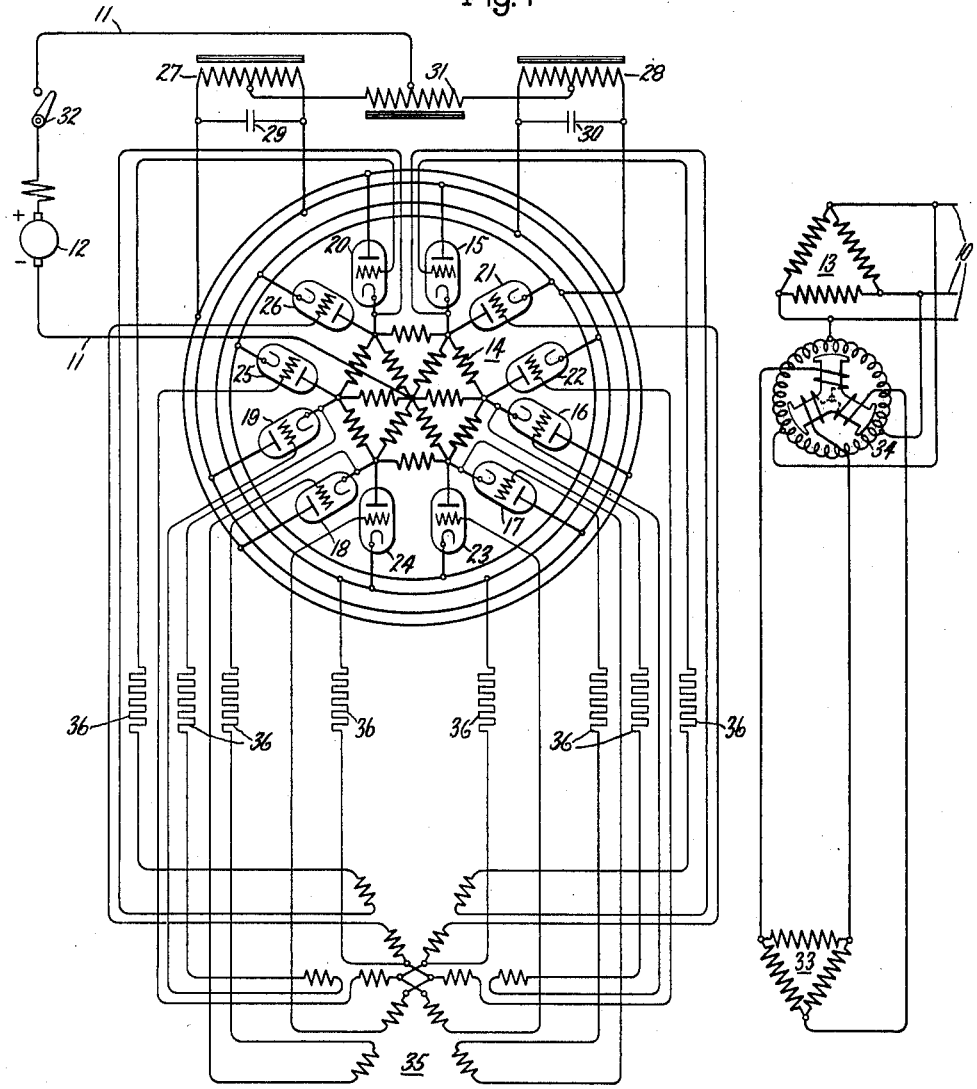

May 29, 1934.  C. H. WILLIS  1,961,026
ELECTRIC VALVE CONVERTING APPARATUS
Filed Oct. 1, 1931   4 Sheets-Sheet 1

Inventor:
Clodius H. Willis,
by *Charles E. Mullan*
His Attorney.

May 29, 1934.   C. H. WILLIS   1,961,026
ELECTRIC VALVE CONVERTING APPARATUS
Filed Oct. 1, 1931   4 Sheets-Sheet 3

Inventor:
Clodius H. Willis,
by   Charles A. Mullen
His Attorney.

May 29, 1934.  C. H. WILLIS  1,961,026
ELECTRIC VALVE CONVERTING APPARATUS
Filed Oct. 1, 1931   4 Sheets-Sheet 4

Inventor:
Clodius H. Willis,
by Charles E. Tullar
His Attorney.

Patented May 29, 1934

1,961,026

UNITED STATES PATENT OFFICE 1,961,026

ELECTRIC VALVE CONVERTING APPARATUS

Clodius H. Willis, Princeton, N. J., assignor to General Electric Company, a corporation of New York Application October 1, 1931, Serial No. 566,371

31 Claims. (Cl. 175—363)

My invention relates to electric valve converting apparatus and more particularly to such apparatus adapted to transmit energy between direct and alternating current circuits. Although my invention is of general application, it is particularly suitable for use as a regenerative rectifier, that is, as an arrangement for transmitting energy from an alternating current circuit to a direct current circuit connected to apparatus having a variable counter-electromotive force.

Heretofore, there have been devised numerous arrangements including electric valves for transmitting energy between direct and alternating current circuits. When operating the apparatus of the prior art as a regenerative rectifier, that is, when supplying energy from an alternating current circuit to a direct current circuit having a variable counter-electromotive force and reversing the direction of energy flow when the counter-electromotive force rises above a predetermined value, it has been customary to secure the reversal of energy through the apparatus by operating a reversing switch in circuit with the source of counter-electromotive force. Some such operation is of course necessary, due to the unilateral conductivity characteristics of the electric valves. The operation of such switching apparatus has many well known disadvantages in addition to the tendency to cause voltage and current surges which subject the various apparatus to severe strains and produce irregular operation. The above arrangements of the prior art have also had decided power factor limitations in that they have been capable of transmitting energy from the alternating current circuit to the direct current circuit at variable voltage only under lagging power factor conditions on the alternating current circuit, and of transmitting energy in the opposite direction only at leading power factors, which are the antitheses of the most desirable operating characteristics. However, the broad feature of transmitting energy between direct and alternating current circuits under any desired power factor conditions on the alternating current circuit, per se, forms no part of my present invention, but is disclosed and broadly claimed in my copending applications, Ser. No. 566,373, and Ser. No. 566,372, filed October 1, 1931, now United States Letters Patent Nos. 1,929,726 and 1,929,725 respectively, both assigned to the same assignee as the present application.

It is an object of my invention, therefore, to provide an improved electric valve converting apparatus for transmitting energy in either direction between direct and alternating current circuits which will overcome the above mentioned disadvantages of the arrangements of the prior art, and will be simple, reliable, and efficient in operation.

It is another object of my invention to provide an improved electric valve converting apparatus for transmitting power in either direction between an alternating current circuit and a direct current circuit having a variable counter-electromotive force in which the direction of power flow may be reversed without the use of any mechanical switching apparatus.

It is a further object of my invention to provide an improved electric valve converting apparatus for transmitting energy in either direction between direct and alternating current circuits in which a change in the direction of energy flow may be accomplished without any current or voltage surges in the apparatus.

It is a still further object of my invention to provide an improved electric power converting apparatus for transmitting energy in either direction between direct and alternating current circuits under any desired power factor conditions on the alternating current circuit.

In accordance with one embodiment of my invention, direct and alternating current circuits are interconnected through an inductive winding or network of inductive windings and two groups of electric valves oppositely connected with respect to said winding. By this arrangement, energy flowing from the alternating current circuit to the direct current circuit will flow through one group of electric valves and, when the counter-electromotive force of the direct current circuit rises above a predetermined value, energy will flow therefrom to the alternating current circuit through the other group of electric valves. In order substantially to eliminate voltage and current surges in the apparatus upon sudden changes in load conditions or upon the reversal of energy flow therethrough, a reactor is included in the circuit of each of said groups of valves and these reactors are mutually coupled so that, upon the occurrence of a sudden change in load on one of the circuits, the change in energy of the reactor corresponding to changing load conditions will be converted by the apparatus including the idle tubes to maintain current and voltage conditions substantially constant or variable at a uniform rate. A series connected impedance means is also provided for impressing between adjacent electric valves of each group an alternating potential for commutating the current between these valves against the electromotive force of the winding interconnecting these valves, so that energy may be transmitted between the circuits under non-unity power factor conditions on the alternating current circuit.

In accordance with a modification of my invention there is introduced between the connections of corresponding valves of the two groups to the inductive windings, an alternating potential for producing a circulating current through the mutually coupled reactors and through the series connected impedance means. This circulating current affords a smoother transition upon the reversal of direction of energy flow and also maintains a commutating voltage across the commutating impedance under light load conditions. The alternating potential for producing the circulating current may be derived from the main inductive winding itself by electrically spacing the connections of corresponding valves of the two groups to the winding, in which case the circulating potential will vary with the power factor of the current transmitted through the apparatus, or it may be provided by means of an independent inductive winding. In accordance with another modification of my invention, a predetermined regulation in the voltage ratio of the circuits is maintained. In this arrangement, the several electric valves are provided with control grids which are excited from the alternating current circuit with a potential either constant or variable in phase. There is also connected in the series with the grid circuits of the several valves, an alternating potential derived from an impedance bridge, the unbalance voltage of which is responsive to the direction and magnitude of the load current, but independent of the circulating current through the apparatus.

Figure 2:
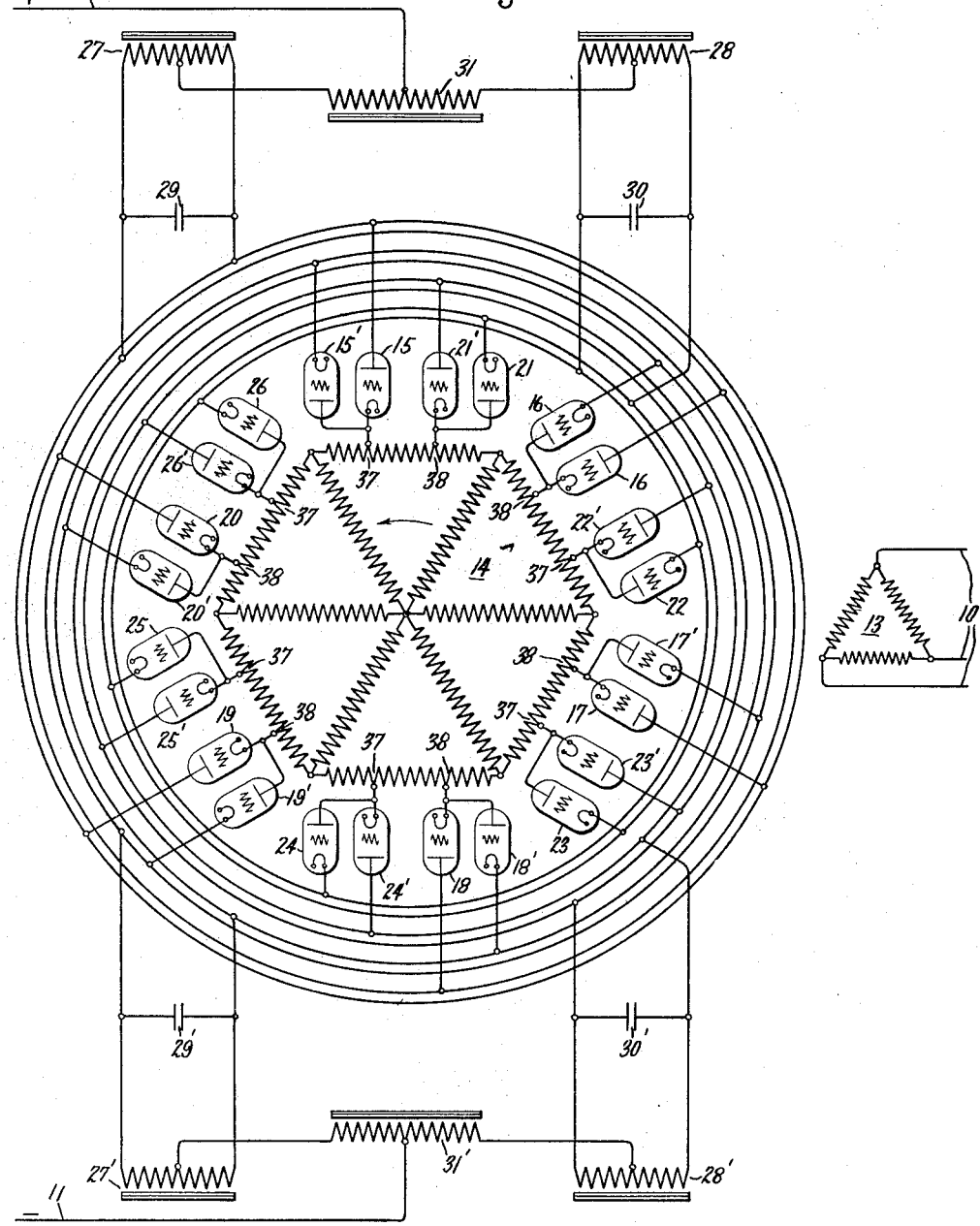
Figure 3:
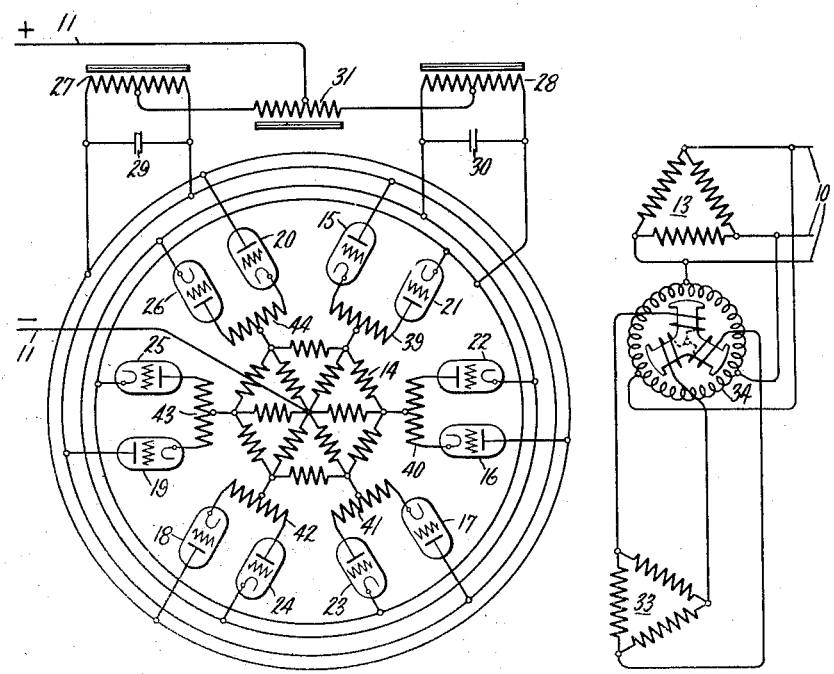
Figure 4:
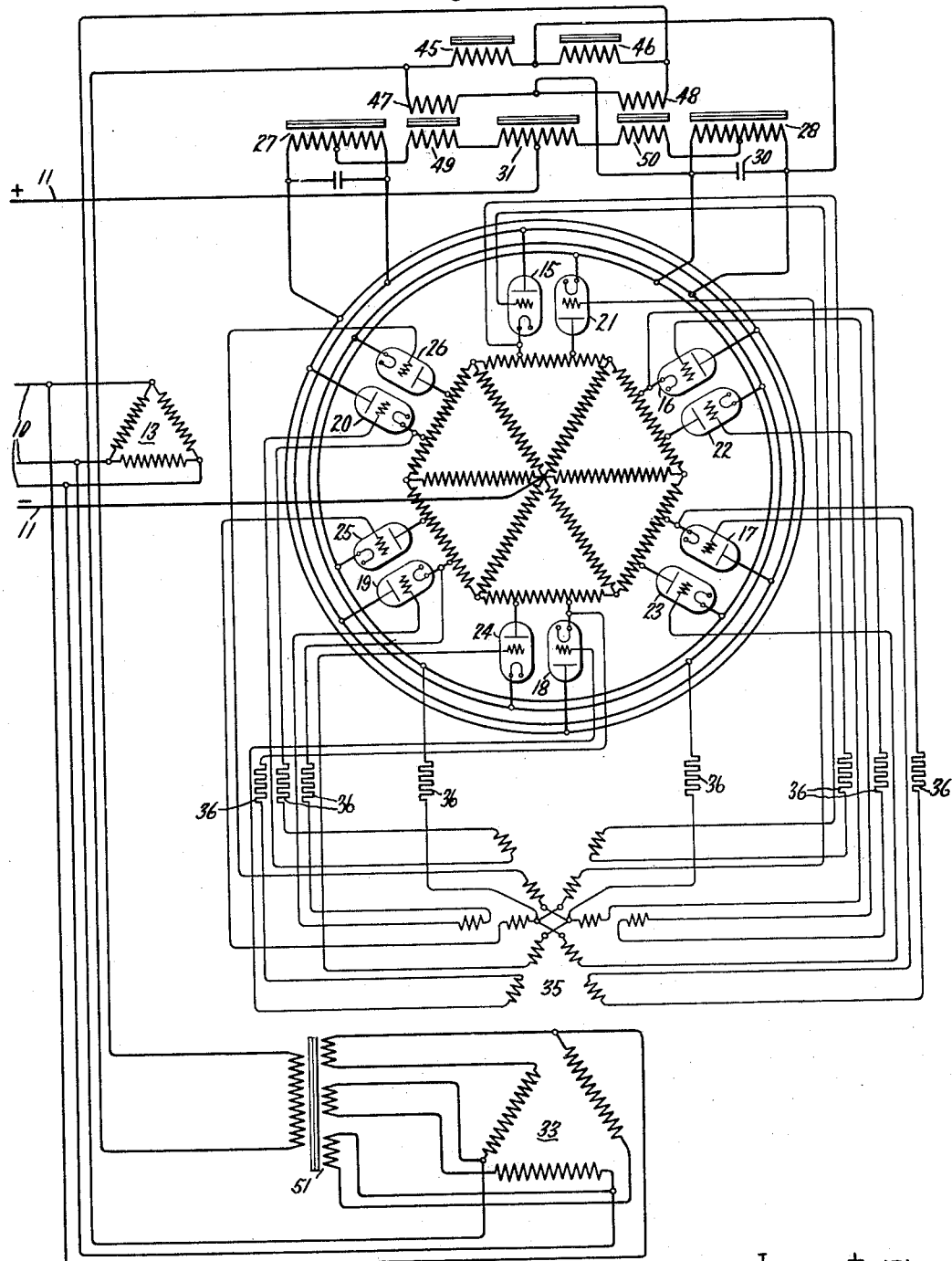

For a better understanding of my invention, together with other and further objects thereof, reference is had to the following description taken in connection with the accompanying drawings, and its scope will be pointed out in the appended claims. Fig. 1 of the drawings illustrates my invention as applied to an arrangement for transmitting energy between a three-phase alternating current circuit and a direct current circuit connected to apparatus having a variable counter-electromotive force; Fig. 2 represents a modification of my invention which includes means for producing a circulating current through the apparatus; Fig. 3 is a further modification in which the circulating current is provided by independent inductive windings, while Fig. 4 illustrates an extension of my invention to an arrangement in which a predetermined regulation in the voltage ratio of the circuits is obtained.

Referring now to Fig. 1 of the drawings there is illustrated an arrangement for transmitting energy between a three-phase alternating current circuit 10 and a direct current circuit 11 to which is connected a source of variable counter-electromotive force, illustrated as a series direct current motor 12. This apparatus includes a transformer comprising a three-phase winding 13 connected to the alternating current circuit 10 and a six-phase network 14 connected across the direct current circuit through a group of valves 15–20 inclusive, and a second group of valves 21–26 inclusive, oppositely connected with respect to the first group of valves. Adjacent valves of the groups 15–20 inclusive, and 21–26 inclusive, are interconnected through inductive windings 27 and 28 across which are connected capacitors 29 and 30, respectively. One side of the direct current circuit 11 is connected to the electrical neutral of the network 14, while the other side is connected to the electrical midpoints of the windings 27 and 28 through opposite halves of an inductive winding 31. If desired, disconnecting means may be interposed between the motor 12 and the circuit 11, conventionally illustrated as a switch 32. Each of the electric valves 15–26, inclusive, is provided with an anode and a cathode, and may be of any of the several types well known in the art, although I prefer to use valves of the vapor electric discharge type. In order to control the voltage ratio of the circuits, as for example, in bringing the motor 12 up to speed, at least one group of electric valves is provided with control grids, and, in order to provide most flexible control of the apparatus, both groups of valves are preferably provided with control grids. In order to excite the grids of the several electric valves, there is provided a grid transformer having a primary winding 33 connected to the alternating current circuit 10 through a rotary phase shifting transformer 34 and a secondary network 35 comprising separate insulated phase windings for exciting the grids of the valves or groups of valves having independent cathode potentials. The grid transformer comprising the windings 33 and 35 should be made self-saturating or separate means should be interposed between this transformer and the grids of the several electric valves to insure that they receive an excitation of peaked wave form, since each valve is to be made conductive for only 60 electrical degrees. However, this feature of supplying peaked excitation to the valve grids forms no part of my present invention, but is disclosed and broadly claimed in the copending application of B. D. Bedford, Ser. No. 485,335, filed September 29, 1930, and assigned to the same assignee as the present application. If desired, current limiting resistors 36 may be included in the connections to the several grids.

While I have illustrated by way of an example a six phase half wave valve converting apparatus, it will be obvious to those skilled in the art that my invention is equally applicable to a converting apparatus of any number of phases or a full wave converting apparatus, in which case the negative side of the direct current circuit 11 will be connected to the several terminals of the network 14 in the same manner as the positive direct current terminal, rather than to the electrical neutral of the network.

Assuming that the above described apparatus is operating as a rectifier, transmitting energy from the alternating current circuit 10 to the direct current circuit 11, neglecting the regenerative feature of the above described apparatus, and assuming that switch 32 is in the closed position, the operation of the apparatus is that of a simple rectifier with an independent commutating voltage, which will be well understood by those skilled in the art, or may be found explained in detail in my above mentioned application, Ser. No. 566,373. In brief, assuming that one of the electric valves, for example valve 21, is initially made conductive, current will flow from the network 14 through the valve 21, through the right hand portion of reactors 28 and 31, through the direct current circuit 11, to the neutral of the network 14. Neglecting the magnetizing admittance of the winding 28, it is seen that the capacitor 30 is effectively in series with the current flowing through this winding so that during the interval in which the valve 21 is conductive, capacitor 30 becomes charged to a potential proportional to the load current flowing. When the next successive valve, that is, valve 22, is rendered conductive, the potential of capacitor 30 is effective to commutate the current between these valves, even though the valve 22 is rendered conductive at a point in the cycle of alternating potential when the electromotive force of the network 14 opposes the transfer of current from the valve 21 to the valve 22. During the next successive interval, capacitor 30 becomes charged to an opposite polarity and in a similar manner the current is successively transferred between the valves 21–26, inc., each valve conducting current for substantially 60 electrical degrees. By means of the rotary phase shifting transformer 34, the point in the cycle of alternating potential at which each of the several valves is made conductive may be controlled to control the voltage impressed upon the direct current circuit 11 and the power factor at which current is delivered from the alternating current circuit 10. Since the potential across the capacitor 30 is dependent upon the load current of the apparatus, the phase of this potential is automatically maintained in such a relation that the maximum potential of this capacitor is effective for commutating the current between the several electric valves. It will be noted that the potential of capacitor 30 reverses polarity six times during a cycle of the alternating potential of the circuit 10, so that it may be considered as a source of third harmonic potential. However, any other well known means for producing a harmonic potential across the windings 27 and 28 may be substituted for the capacitors 29 and 30, respectively, as this feature forms no part of my present invention, but is disclosed and broadly claimed in my Patent No. 1,929,725.

If now, the counter-electromotive force of the machine 12, due to a decrease in load or any other cause, rises to a value above the average value impressed upon the circuit 11 by means of the converting apparatus, energy can no longer flow from the circuit 10 to the circuit 11, but will now flow in a reverse direction, utilizing the left hand portion of the winding 31, the commutating winding 27 and capacitor 29, and the group of electric valves 15–20 inc. The operation of the apparatus while regenerating, that is, while operating as an inverter, is substantially similar to that described above when operating as a rectifier, and, as in the case of the rectifier, the voltage ratio of the two circuits and the power factor at which energy is delivered to the alternating current circuit 10, may be controlled by means of the rotary phase shifting transformer 34.

In case of a sudden change in load on the machine 12, such, for example, as occasioned by opening the switch 32, the reactance of the winding 31 included in the rectifying circuit tending to maintain the load current constant would produce an excessive voltage across the switch 32 which it is very desirable to avoid. With the reactance in the rectifying and inverting circuits inductively coupled by means of the winding 31, however, any sudden change in load conditions on the rectifying circuit 11 which would tend to induce a high voltage in the direct current circuit, produces a similar voltage in the left hand portion of the winding 31 and this voltage tends to raise the effective voltage of the regenerative circuit to transmit energy therethrough from the reactor 31 to the alternating current circuit 10, thus avoiding any excessive voltages across the direct current circuit. This circulating current produced by the inductive coupling of the rectifying and inverting circuits as described above, also substantially tends to prevent any sudden changes of load under normal operating conditions, since sudden decreases in the impedance of the load circuit 12 which would tend to produce sudden increases in the load current of the rectifying apparatus are compensated for by an apparent increase in the impedance of the regenerative circuit inductively coupled to the rectifier circuit. In this manner the inductive coupling between the rectifier and regenerative circuit assists in maintaining a constant load current.

While I have described my invention in connection with a regenerative rectifier circuit, including a load having a variable counter-electromotive force, it will be apparent to those skilled in the art that the invention is not limited thereto but, that it is equally applicable to transmission of energy between any direct and alternating current circuits, one of which circuits includes a variable source of electromotive force or counter-electromotive force. It will also be obvious that, while I have illustrated the grids of all electric valves as being energized from a common source of grid potential, the grids of the two groups of valves may be variable independently so that the ranges of voltage ratios of the circuits for rectifying and regeneration may be independently fixed.

In Fig. 2 there is illustrated a full wave modification of the arrangement of Fig. 1, with the addition of means for producing a circulating current through the apparatus to maintain the commutating voltage under light load conditions. In this arrangement the rectifier apparatus includes the network 14, the groups of electric valves 21–26 inc., and 21'–26' inc., associated respectively with the commutating windings 28 and 28', while the regenerative circuit comprises the network 14 and the groups of valves 15–20 inc., and 15'–20' inc., associated, respectively, with the commutating windings 27 and 27'. The two groups of rectifier valves are connected to the electrically symmetrically spaced terminals 38, while the two groups of regenerative valves are connected to the electrically symmetrically spaced terminals 37 so that the several portions 37—38 of the windings of the network 14 are connected between the corresponding valves of the two groups and impress a voltage between these two groups which is effective to send a circulating current through the apparatus. For the sake of simplicity, the grid circuits of the several electric valves have been omitted, but it will be readily understood that the grid circuit of Fig. 1 may be utilized by adding additional insulated windings to each phase for the additional valves represented by the primed numbers.

With the above described arrangement, if energy is being transmitted between the circuits 10 and 11 at unity power factor, the electromotive force of the inductive network 14 along the axis of conduction of the network will have its maximum value and, since the portions of the windings 37—38 are substantially in quadrature with the electromotive force along the axis of conduction, substantially no circulating current will flow under these conditions. However, under unity power factor conditions, whether the circuit be operating as a rectifier or an inverter, the electromotive force of the inductive network interconnecting adjacent valves will be substantially zero at the instants of commutation so that the only voltage required to commutate the current between these valves will be that required to overcome the arc drop of the valves. This may be supplied by the commutating windings 27, 28, 27' and 28' with their associated capacitors as in the arrangement of Fig. 1. On the other hand, under the other limiting condition, that is the transmission of current between the two circuits at zero power factor, the electromotive force of the inductive network 14 is substantially in quadrature with the axis of conduction, so that the electromotive force of the inductive network interconnecting adjacent valves will be substantially at maximum and will oppose commutation if the apparatus is operating as a rectifier with zero power factor leading, or as an inverter with zero power factor lagging. Under these conditions, however, the electromotive force of the portions of the network 37—38 interconnecting the rectifying and regenerating valves has its maximum value and will produce a maximum circulating current through the commutating windings 27, 28, 27' and 28' and the reactors 31 and 31'. This circulating current flowing through the several commutating windings produces a voltage across their associated capacitors which is effective to commutate the current between the adjacent electric valves against the electromotive force of the inductive winding interconnecting these valves. In this manner it is possible to operate the apparatus at very low power factors and very light loads. For example, assume that the apparatus is operating as a rectifier at substantially 90 degrees leading, that the phase rotation is in the direction indicated by the arrow and that the valves 21 and 24' are initially conductive. Under these conditions, the load current will flow from the network 14 through the valve 21, the right hand portion of the commutating winding 28, the right hand portion of the reactor 31, the direct current circuit, right hand portion of the reactor 31', the right hand portion of commutating winding 28' and electric valve 24' to the diametrically opposite terminal 37. Under these power factor conditions, if the space relations of the several windings of the inductive network 14 represent the time phase relations of the voltages of the respective windings, the electromotive force of the network 14 will lie substantially along the horizontal diametrical windings of the network 14, as illustrated in the figure. That is, during the interval in which the valves 21 and 24' are conductive, the maximum instantaneous potential of the network 14 will lie along the horizontal diameter. Under these conditions, substantially the maximum potential of the portion of the windings 37—38 is impressed between the valves 21 and 15 and a circulating current will flow through the circuit including the windings 37—38, electric valve 21, right hand portion of commutating winding 28, the reactor 31, the right hand portion of commutating winding 27 and electric valve 15. A similar circulating current will flow through electric valves 24' and 18' and reactor 31'. These circulating currents will produce commutating potentials across capacitors 29, 30, 29' and 30', even under extremely light load conditions, which is effective to commutate the current between the several electric valves. This circulating current varies with the power factor, increasing with very low power factors, which condition requires a maximum commutating potential. In this way the regulation of the commutating potential is automatic in its nature.

In Fig. 3 is illustrated a modification of the arrangement of Fig. 2 in which the alternating potential for producing the circulating current is provided by means of independent inductive windings interconnecting the rectifying and regenerating valves. In this arrangement, the corresponding valves of the group 15–20 inc., and 21–26 inc., are interconnected through inductive windings 39–44 inc. The windings 39–44 may be energized from any suitable source of alternating potential but preferably comprise additional secondary windings of the grid transformer having a primary winding 33 energized from the alternating current circuit 10 through a rotary phase shifting transformer 34. The grids of the several electric valves are excited similarly to the arrangement of Fig. 1, and, with this arrangement, the phase of the alternating potentials appearing in the windings 39–44 inc., is automatically varied in accordance with the grid excitation of the several electric valves; that is, with their periods of conductivity so that the maximum potentials of the windings 39–44 inc., are always available for producing a circulating current through the apparatus, thus insuring a constant component of circulating current and commutating voltage under all power factor conditions. The operation of this last described arrangement will be clear in view of the foregoing description in connection with Figs. 1 and 2.

In Fig. 4 there is illustrated an arrangement for automatically obtaining a predetermined regulation in the ratio of the voltages of the direct and alternating current circuits. This arrangement is a half wave modification of that illustrated in Fig. 2 and is similar thereto, except for the grid excitation circuit. This regulation is obtained by adding to the excitation of the primary winding 33 of the grid transformer, an alternating component variable in magnitude in accordance with the load transmitted by the apparatus. This variable component is obtained by means of an inductance bridge comprising reactors 45 and 46 and saturable reactors 47 and 48, provided with saturating windings 49 and 50, respectively, connected in series with the commutating windings 27 and 28, respectively. One diagonal of this inductance bridge is connected to be energized with the potential across the capacitor 30, which as stated above, is a third harmonic of the fundamental alternating potential, although the bridge may be energized from any other potential derived from the circuit which varies in accordance with the load transmitted through the apparatus. The output diagonal of the inductance bridge is connected to excite the primary winding of the transformer 51 provided with three secondary windings connected in series with the several phase windings of the primary winding 33 of the grid transformer.

With the above described connections, any change in the load current affects the unbalance voltage of the inductance bridge, while the circulating current of the apparatus affects both reactors 47 and 48 similarly, and hence has no effect upon the unbalance voltage of the bridge. That is, the unbalance voltage of the inductance bridge will vary with respect to the voltage of the alternating current circuit 10 in magnitude and polarity in accordance with the magnitude and direction of the load current, and in phase relation in accordance with variations in the power factor at which energy is transmitted through the apparatus. Under unity power factor conditions, this third harmonic potential will be substantially in quadrature with the fundamental so that variations in the magnitude of the harmonic potential will vary the point at which the combined wave of grid potential crosses the zero axis; which is approximately the instant at which the corresponding electric valve is made conductive. That is, the effective phase relation of the grid potential will vary in accordance with the load transmitted by the apparatus. Obviously a change in the phase relation of the grid potential will vary the voltage ratio of the direct and alternating current circuits and, by proper selection of the circuit constants, any predetermined regulation curve may be obtained. While the rotary phase shifting transformer of Figs. 1 and 3 has been omitted, it will be obvious that such a transformer may be interposed in the connections between the alternating current circuit 10 and the primary winding 33 of the grid transformer in order to vary the regulation characteristics of the apparatus.

While I have described what I at present consider preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. Apparatus for transmitting energy between direct and alternating current circuits comprising an inductive winding in energy transmitting relation with respect to said alternating current circuit, and a plurality of similarly disposed electric valves for interconnecting said winding with one side of said direct current circuit to transmit energy from said alternating current circuit to said direct current circuit for predetermined ratios of the voltages of said circuits, a plurality of other electric valves oppositely associated with said winding for interconnecting said winding and said direct current circuit to transmit energy from said direct current circuit to said alternating current circuit for other ratios of the voltages of said circuits and means for controlling the conductivity of said second group of valves.

2. Apparatus for transmitting energy between direct and alternating current circuits comprising an inductive winding in energy transmitting relation with respect to said alternating current circuit, a group of similarly disposed electric valves for interconnecting said winding with one side of said direct current circuits to transmit energy from said alternating current circuit to said direct current circuit for predetermined ratios of the voltages of said circuits, a second group of electric valves oppositely associated with said winding for interconnecting said winding and said direct current circuit to transmit energy from said direct current circuit to said alternating current circuit for other ratios of the voltages of said circuits, one of said groups of valves being provided with control grids, and means for variably exciting said control grids to determine the ratios of the voltages of said circuits, and thus the direction of energy flow through the apparatus.

3. Apparatus for transmitting energy between direct and alternating current circuits comprising an inductive winding in energy transmitting relation with respect to said alternating current circuit, a group of similarly disposed grid controlled electric valves for interconnecting said winding with one side of said direct current circuit to transmit energy from said alternating current circuit to said direct current circuit for predetermined ratios of the voltages of said circuits, a second group of grid controlled electric valves oppositely associated with said winding for interconnecting said winding and said direct current circuit to transmit energy from said direct current circuit to said alternating current circuit for other ratios of the voltages of said circuits, and means for exciting the grids of said valves with a periodic potential variable in phase with respect to that of said alternating current circuit to determine the ratios of the voltages of said circuits and thus the direction of energy flow through the apparatus.

4. Apparatus for transmitting energy between an alternating current circuit and a direct current circuit including a source of counter-electromotive force, comprising an inductive winding in energy transmitting relation with respect to said alternating current circuit, a group of similarly disposed grid controlled electric valves for interconnecting said winding with one side of said direct current circuit to transmit energy from said alternating current circuit to said direct current circuit, means for variably exciting the control grids of said valves to control the average voltage supplied to said direct current circuit from said alternating current circuit, and a group of other electric valves oppositely associated with said winding for interconnecting said winding and said direct current circuit to transmit energy between said circuits in an opposite direction when said counter-electromotive force is greater than the voltage supplied to said direct current circuit.

5. Apparatus for transmitting energy between direct and alternating current circuits comprising an inductive winding in energy transmitting relation with respect to said alternating current circuit, a group of similarly disposed electric valves for interconnecting said winding with one side of said direct current circuit to transmit energy from said alternating current circuit to said direct current circuit, a second group of electric valves oppositely associated with said winding for interconnecting said winding and said direct current circuit to transmit energy from said direct current circuit to said alternating current circuit, one of said groups of valves being provided with control grids, means for variably exciting the grids of said group of valves to determine the direction of energy flow through the apparatus, and means for impressing between adjacent valves of said group of grid controlled valves a periodic potential for commutating the current therebetween against the electromotive force of the winding interconnecting said valves, whereby energy may be transmitted through said apparatus at any desired power factor on said alternating current circuit.

6. Apparatus for transmitting energy between direct and alternating current circuits comprising an inductive winding in energy transmitting relation with respect to said alternating current circuit, a group of similarly disposed grid controlled electric valves for interconnecting said winding with one side of said direct current circuit to transmit energy from said alternating current circuit to said direct current circuit, a second group of grid controlled electric valves oppositely associated with said winding for interconnecting said winding and said direct current circuit to transmit energy from said direct current circuit to said alternating current circuit, means for variably exciting the grids of said valves to determine the direction of energy flow through the apparatus, a pair of impedance elements, each connected in series circuit relationship with the load current of a group of said valves and being so associated therewith that its terminal potential is effective to commutate the current between adjacent valves of the group against the electromotive force of the inductive winding interconnecting them, whereby energy may be transmitted in either direction through said apparatus at leading or lagging power factors on said alternating current circuit.

7. Apparatus for transmitting energy between direct and alternating current circuits comprising an inductive winding in energy transmitting relation with respect to said alternating current circuit, a group of similarly disposed electric valves for interconnecting said winding with one side of said direct current circuit to transmit energy from said alternating current circuit to said direct current circuit, a second group of electric valves oppositely associated with said winding for interconnecting said winding and said direct current circuit to transmit energy from said direct current circuit to said alternating current circuit, one of said groups of valves being provided with control grids, and means for variably exciting the grids of said group of said valves to determine the direction of energy flow through the apparatus, and a capacitor connected in series circuit relationship with the load current of said group of grid controlled valves and so associated therewith that its terminal potential is effective to commutate the current between adjacent valves of said group against the electromotive force of the inductive winding interconnecting said valves, whereby energy may be transmitted through said apparatus at leading or lagging power factors on said alternating current circuit.

8. Apparatus for transmitting energy between direct and alternating current circuits comprising an inductive winding in energy transmitting relation with respect to said alternating current circuit, a group of similarly disposed electric valves for interconnecting said winding with one side of said direct current circuit to transmit energy from said alternating current circuit to said direct current circuit, a second group of electric valves oppositely associated with said winding for interconnecting said winding and said direct current circuit to transmit energy from said direct current circuit to said alternating current circuit, one of said groups of valves being provided with control grids, means for variably exciting the grids of said group of said valves to determine the direction of energy flow through the apparatus, a commutating winding connected between adjacent valves of said group of grid controlled valves, and means for producing across said winding a periodic potential for commutating the load current between said valves against the electromotive force of the winding interconnecting said valves, whereby energy may be transmitted through said apparatus at leading or lagging power factors on said alternating current circuit.

9. Apparatus for transmitting energy between direct and alternating current circuits comprising an inductive winding in energy transmitting relation with respect to said alternating current circuit, a group of similarly disposed electric valves for interconnecting said winding with one side of said direct current circuit to transmit energy from said alternating current circuit to said direct current circuit for predetermined ratios of the voltages of said circuits, a second group of electric valves oppositely associated with said winding for interconnecting said winding and said direct current circuit to transmit energy from said direct current circuit to said alternating current circuit for other ratios of the voltages of said circuits, means for controlling the conductivity of said second group of valves, and a reactor in the direct current circuit of each of said groups of valves, said reactors being mutually coupled to prevent excessive changes in voltage on said direct current circuit due to sudden changes in load thereon.

10. Apparatus for transmitting energy between direct and alternating current circuits comprising an inductive winding in energy transmitting relation with respect to said alternating current circuit, a group of similarly disposed electric valves for interconnecting said winding and the direct current circuit to transmit energy from the alternating current circuit to the direct current circuit, a second group of electric valves for interconnecting said winding and the direct current circuit and oppositely connected with respect to said winding to transmit energy from said direct current circuit to said alternating current circuit, one of said groups of valves being provided with control grids, means for variably exciting the control grids of said group of valves to determine the direction of energy flow through the apparatus, and a reactor in the connections between the direct current circuit and each group of valves, said reactors being mutually coupled to prevent excessive changes in voltage on said direct current circuit due to sudden changes in load thereon.

11. Apparatus for transmitting energy between direct and alternating current circuits comprising a reactor provided with an electrical midpoint for connection to one side of said direct current circuit and with two end terminals, an inductive winding and a group of electric valves, each having one terminal connected to said winding and having their other terminals connected together for connection to one terminal of said reactor, said winding and group of valves being adapted to transmit energy from said alternating current circuit to said direct current circuit for predetermined ratios of the voltages of said circuits, a second group of electric valves, each having connected to said winding the opposite terminal from that of said first group and having their other terminals connected together for connection to the other terminal of said reactor, said winding and second group of valves being adapted to transmit energy from said direct current circuit to said alternating current circuit for other ratios of the voltages of said circuits and means for controlling the conductivity of said second group of valves.

12. Apparatus for transmitting energy between direct and alternating current circuits comprising an inductive winding in energy transmitting relation with respect to said alternating current circuit, a group of similarly disposed electric valves for interconnecting said winding and the direct current circuit to transmit energy from said alternating current circuit to said direct current circuit for predetermined voltage ratios of said circuits, a second group of electric valves for interconnecting said winding and the direct current circuit and oppositely connected with respect to said winding to transmit energy from said direct current circuit to said alternaing current circuit for other voltage ratios of said circuits, means for controlling the conductivity of said second group of valves, and means for including between the connections of corresponding valves of said groups to said winding an alternating potential to produce a circulating current through said apparatus.

13. Apparatus for transmitting energy between direct and alternating current circuits comprising an inductive winding in energy transmitting relation with respect to said alternating current circuit, a group of similarly disposed electric valves for interconnecting said winding and the direct current circuit to transmit energy from said alternating current circuit to said direct current circuit for predetermined voltage ratios of said circuits, a second group of electric valves for interconnecting said winding and the direct current circuit and oppositely connected with respect to said winding to transmit energy from said direct current circuit to said alternating current circuit for other voltage ratios of said circuits, means for controlling the conductivity of said second group of valves, and means for including between the connections of corresponding valves of said groups to said winding an alternating potential displaced in phase with respect to the electromotive force of the alternating current circuit impressed upon the direct current circuit to produce a circulating current through said apparatus.

14. Apparatus for transmitting energy between direct and polyphase alternating current circuits comprising a polyphase network of inductive windings, a group of similarly disposed electric valves for interconnecting said network and the direct current circuit to transmit energy from said alternating current circuit to said direct current circuit for predetermined voltage ratios of said circuits, a second group of electric valves for interconnecting said network and the direct current circuit and oppositely connected with respect to said winding to transmit energy from said direct current circuit to said alternating current circuit for other voltage ratios of said circuits, means for controlling the conductivity of said second group of valves and means for including between the connections of corresponding valves of said groups to said network an alternating potential substantially in quadrature with the electromotive force of said network along the axis of conduction to produce a circulating current through said apparatus variable in accordance with the power factor of the load current.

15. Apparatus for transmitting energy between direct and alternating current circuits comprising an inductive winding in energy transmitting relation with respect to said alternating current circuit, and provided with a plurality of electrically spaced terminals, a group of similarly disposed electric valves for interconnecting certain of said terminals and the direct current circuit to transmit energy from said alternating current circuit to said direct current circuit for predetermined voltage ratios of said circuits, a second group of valves for interconnecting other of said terminals and the direct current circuit and oppositely connected with respect to said winding to transmit energy from said direct current circuit to said alternating current circuit for other voltage ratios of said circuits, the portion of said winding included between the connections to corresponding valves of said groups serving to produce a circulating current through said apparatus, and means for controlling the conductivity of said second group of valves.

16. Apparatus for transmitting energy between direct and polyphase alternating current circuits comprising a polyphase network of inductive windings provided with a group of electrically symmetrically spaced terminals, a group of similarly disposed electric valves for interconnecting said terminals and said direct current circuit to transmit energy from said alternating current circuit to said direct current circuit for predetermined voltage ratios of said circuits, said network being provided also with a group of other electrically symmetrically spaced terminals each of which is spaced from the corresponding terminals of said first group by an inductive winding having an electromotive force substantially in quadrature with that along the axis of conduction of said network, a second group of electric valves for interconnecting said second group of terminals and said direct current circuit to transmit energy from said direct current circuit to said alternating current circuit for other voltage ratios of said circuits and means for controlling the conductivity of said second group of valves.

17. Apparatus for transmitting energy between direct and alternating current circuits comprising an inductive winding in energy transmitting relation with respect to said alternating current circuit, a group of similarly disposed grid controlled electric valves for interconnecting said winding with one side of said direct current circuit to transmit energy from said alternating current circuit to said direct current circuit, a second group of grid controlled electric valves oppositely associated with said winding for interconnecting said winding and said direct current circuit to transmit energy from said direct current circuit to said alternating current circuit, means for variably exciting the grids of said valves to determine the direction of energy flow through said apparatus, a pair of impedance elements, each being connected in series circuit relationship with the load current of the apparatus of a given direction, and being so associated with one of said groups of valves that its terminal potential is available to commutate the current between adjacent valves against the electromotive force of the inductive winding interconnecting said valves, and means for including between the connections of corresponding valves of said groups to said winding an alternating potential to produce a circulating current through said impedance elements, whereby energy may be transmitted in either direction through said apparatus at leading or lagging power factors on said alternating current circuit.

18. Apparatus for transmitting energy between direct and alternating current circuits comprising an inductive winding in energy transmitting relation with respect to said alternating current circuit, a group of similarly disposed grid controlled electric valves for interconnecting said winding with one side of said direct current circuit to transmit energy from said alternating current circuit to said direct current circuit, a second group of grid controlled electric valves oppositely associated with said winding for interconnecting said winding and said direct current circuit to transmit energy from said direct current circuit to said alternating current circuit, means for variably exciting the grids of said valves to determine the direction of energy flow through said apparatus, a pair of impedance elements, each being connected in series circuit relationship with the load current of the apparatus of a given direction and being so associated with one of said groups of valves that its terminal potential is available to commutate the current between adjacent valves against the electromotive force of the inductive winding interconnecting said valves, and means for including between the connections of corresponding valves of said groups to said winding an alternating potential substantially in quadrature with that of said inductive winding along the axis of conduction to produce a circulating current through said impedance elements variable inversely with variations in the power factor on said alternating current circuit, whereby energy may be transmitted in either direction through said apparatus at leading or lagging power factors on said alternating current circuit.

19. Apparatus for transmitting energy between direct and alternating current circuits comprising an inductive winding in energy transmitting relation with respect to said alternating current circuit, a group of similarly disposed electric valves for interconnecting said winding and the direct current circuit to transmit energy from said alternating current circuit to said direct current circuit for predetermined voltage ratios of said circuits, a second group of electric valves for interconnecting said winding and the direct current circuit and oppositely connected with respect to said winding to transmit energy from said direct current circuit to said alternating current circuit for other voltage ratios of said circuits, means for controlling the conductivity of said second group of valves, and a source of alternating potential interposed between the connections of corresponding valves of said groups to said winding, said alternating potential being substantially in phase with the corresponding valve currents to produce a circulating current through the apparatus.

20. Apparatus for transmitting energy between direct and alternating current circuits comprising an inductive winding in energy transmitting relation with respect to said alternating current circuit, a group of similarly disposed electric valves for interconnecting said winding with one side of said direct current circuit to transmit energy from said alternating current circuit to said direct current circuit, a second group of electric valves oppositely associated with said winding for interconnecting said winding and said direct current circuit to transmit energy from said direct current circuit to said alternating current circuit, one of said groups of valves being provided with control grids, and a source of alternating potential variable in phase with respect to that of said alternating current circuit for exciting the control grids of said group of valves to determine the direction of energy flow through the apparatus, said source also being interposed between the connections of corresponding valves of said groups to said winding to produce a substantially constant circulating current through said apparatus.

21. Apparatus for transmitting energy between direct and alternating current circuits comprising an inductive winding in energy transmitting relation with respect to said alternating current circuit, a group of similarly disposed electric valves for interconnecting said winding with one side of said direct current circuit to transmit energy from said alternating current circuit to said direct current circuit for predetermined ratios of the voltages of said circuits, a second group of electric valves oppositely associated with said winding for interconnecting said winding and said direct current circuit to transmit energy from said direct current circuit to said alternating current circuit for other ratios of the voltages of said circuits, means for determining the ratios of the voltages of said circuits, and means responsive to the load current flowing through said apparatus for modifying the action of said ratio determining means.

22. Apparatus for transmitting energy between direct and alternating current circuits comprising an inductive winding in energy transmitting relation with respect to said alternating current circuit, a group of similarly disposed electric valves for interconnecting said winding with one side of said direct current circuit to transmit energy from said alternating current circuit to said direct current circuit, a second group of electric valves oppositely associated with said winding for interconnecting said winding and said direct current circuit to transmit energy from said direct current circuit to said alternating current circuit, one of said groups of valves being provided with control grids, means for variably exciting said control grids to determine the voltage ratio of said circuits, and means responsive to the load current flowing through said apparatus for modifying said grid excitation to effect a predetermined regulation in the voltage ratio of said circuits.

23. Apparatus for transmitting energy between direct and alternating current circuits comprising an inductive winding in energy transmitting relation with respect to said alternating current circuit, a group of electric valves for interconnecting said winding with one side of said direct current circuit to transmit energy from said alternating current circuit to said direct current circuit, a second group of electric valves oppositely associated with said winding for interconnecting said winding and said direct current circuit to transmit energy from said direct current circuit to said alternating current circuit, one of said groups of valves being provided with control grids, means for exciting said control grids including an alternating component of the frequency of said alternating current circuit and a second component variable in accordance with the load current transmitted by said apparatus to vary the phase of the valve currents and regulate the voltage ratio of said circuits.

24. Apparatus for transmitting energy between direct and alternating current circuits comprising an inductive winding in energy transmitting relation with respect to said alternating current circuit, a group of electric valves for interconnecting said winding with one side of said direct current circuit to transmit energy from said alternating current circuit to said direct current circuit, a second group of electric valves oppositely associated with said winding for interconnecting said winding and said direct current circuit to transmit energy from said direct current circuit to said alternating current circuit, one of said groups of valves being provided with control grids, means for exciting said control grids including an alternating component of the frequency of said alternating current circuit and an alternating component which is a harmonic of the frequency of the alternating current circuit, said harmonic component being variable in magnitude in accordance with the load current transmitted by the apparatus to vary the phase of the valve current and regulate the voltage ratio of said circuits.

25. Apparatus for transmitting energy between direct and alternating current circuits comprising a polyphase inductive winding, a group of electric valves for interconnecting said winding with one side of said direct current circuit to transmit energy from said alternating current circuit to said direct current circuit, a second group of electric valves oppositely associated with said winding for interconnecting said winding and said direct current circuit to transmit energy from said direct current circuit to said alternating current circuit, one of said groups of valves being provided with control grids, an impedance element connected in series circuit relationship with the load current of said group of grid controlled valves and being so associated with said valves that its terminal potential is available to commutate the current between adjacent valves against the electromotive force of the inductive winding interconnecting them, means for including between the connections of corresponding valves of said groups to said winding an alternating potential to produce a circulating current through said impedance element and thus a commutating potential for said valves whereby current may be transmitted in either direction through said apparatus at leading or lagging power factors on said alternating current circuit, means for exciting said control grids for varying the voltage ratio of said circuits, and means responsive to the load current of the apparatus and independent of the circulating current for modifying said excitation means to produce a predetermined regulation of the voltage ratio of said circuits.

26. Apparatus for transmitting energy between direct and alternating current circuits comprising a polyphase inductive winding, a group of electric valves for interconnecting said winding with one side of said direct current circuit to transmit energy from said alternating current circuit to said direct current circuit, a second group of electric valves oppositely associated with said winding for interconnecting said winding and said direct current circuit to transmit energy from said direct current circuit to said alternating current circuit, one of said groups of valves being provided with control grids, an impedance element connected in series circuit relationship with the load current of said group of grid controlled valves and being so associated with said valves that its terminal potential is available to commutate the current between adjacent valves against the electromotive force of the inductive winding interconnecting them, means for including between the connections of corresponding valves of said groups to said winding an alternating potential to produce a circulating current through said impedance element and thus a commutating potential for said valves whereby current may be transmitted in either direction through said apparatus at leading or lagging power factors on said alternating current circuit, a circuit for exciting said control grids from said alternating current circuit, an impedance bridge energized from the potential across said impedance element, said bridge including a pair of saturable reactors, each connected to be saturated by the load current of one group of valves, the connections being such that the unbalance of the bridge varies with the load current of the apparatus but is independent of the circulating current, the unbalance voltage of said bridge being connected in series with said grid excitation to vary the phase of the valve currents with variations in load and maintain a predetermined regulation of the voltage ratio of said circuits.

27. A regenerative rectifier system comprising an alternating current supply circuit, a regenerative load circuit, electric valve converting apparatus interconnecting said circuits for transmitting energy from said supply circuit to said load circuit for predetermined ratios of the voltages of said circuits, a second electric valve converting apparatus also interconnecting said circuits for transmitting energy from said load circuit to said supply circuit for other ratios of the voltages of said circuits, and means for varying the ratio of the voltages of said circuits at which the direction of energy flow therebetween is reversed.

28. A regenerative rectifier system comprising an alternating current supply circuit, a regenerative load circuit, electric valve converting apparatus interconnecting said circuits for transmitting energy from said supply circuit to said load circuit for predetermined ratios of the voltages of said circuits, a second electric valve converting apparatus also interconnecting said circuits for transmitting energy from said load circuit to said supply circuit for other ratios of the voltages of said circuits, and an inductive coupling between said two converting apparatus.

29. A regenerative rectifier system comprising an alternating current supply circuit, a regenerative load circuit, electric valve converting apparatus interconnecting said circuits for transmitting energy from said supply circuit to said load circuit for predetermined ratios of the voltages of said circuits, a second electric valve converting apparatus also interconnecting said circuits for transmitting energy from said load circuit to said supply circuit for other ratios of the voltages of said circuits, each of said converting apparatus including a direct current circuit, and mutually coupled reactors in the direct current circuits of said converting apparatus.

30. A regenerative rectifier system comprising an alternating current supply circuit, a regenerative load circuit, electric valve converting apparatus interconnecting said circuits for transmitting energy from said supply circuit to said load circuit for predetermined ratios of the voltages of said circuits, a second electric valve converting apparatus also interconnecting said circuits for transmitting energy from said load circuit to said supply circuit for other ratios of the voltages of said circuits, and means for maintaining a circulating current between said converting apparatus under predetermined load conditions.

31. A regenerative rectifier system comprising an alternating current supply circuit, a regenerative load circuit, electric valve converting apparatus interconnecting said circuits for transmitting energy from said supply circuit to said load circuit for predetermined ratios of the voltages of said circuits, a second electric valve converting apparatus also interconnecting said circuits for transmitting energy from said load circuit to said supply circuit for other ratios of the voltages of said circuits, and means for maintaining a circulating current between said converting apparatus under predetermined power factor conditions on said alternating current circuit.

CLODIUS H. WILLIS.

CERTIFICATE OF CORRECTION.

Patent No. 1,961,026.   May 29, 1934.

CLODIUS H. WILLIS.

It is hereby certified that error appears in the printed specification of the above numbered patent requiring correction as follows: Page 2, lines 129 and 130, for "application, Ser. No. 566,373" read patent No. 1,929,726; page 3, line 57, for "wuold" read would; page 6, line 22, claim 7, strike out the word "and"; and line 145, claim 12, for "alternaing" read alternating; page 7, line 42, claim 14, after "valves" insert a comma; and line 61, claim 15, for the syllable "and" read ond; and that the said Letters Patent should be read with these corrections therein that the same may conform to the record of the case in the Patent Office.

Signed and sealed this 24th day of July, A. D. 1934.

Bryan M. Battey (Seal)   Acting Commissioner of Patents.